Aug. 26, 1930. J. F. GORDON 1,773,996
CHANGE SPEED GEAR FOR BICYCLES
Filed Oct. 7, 1927
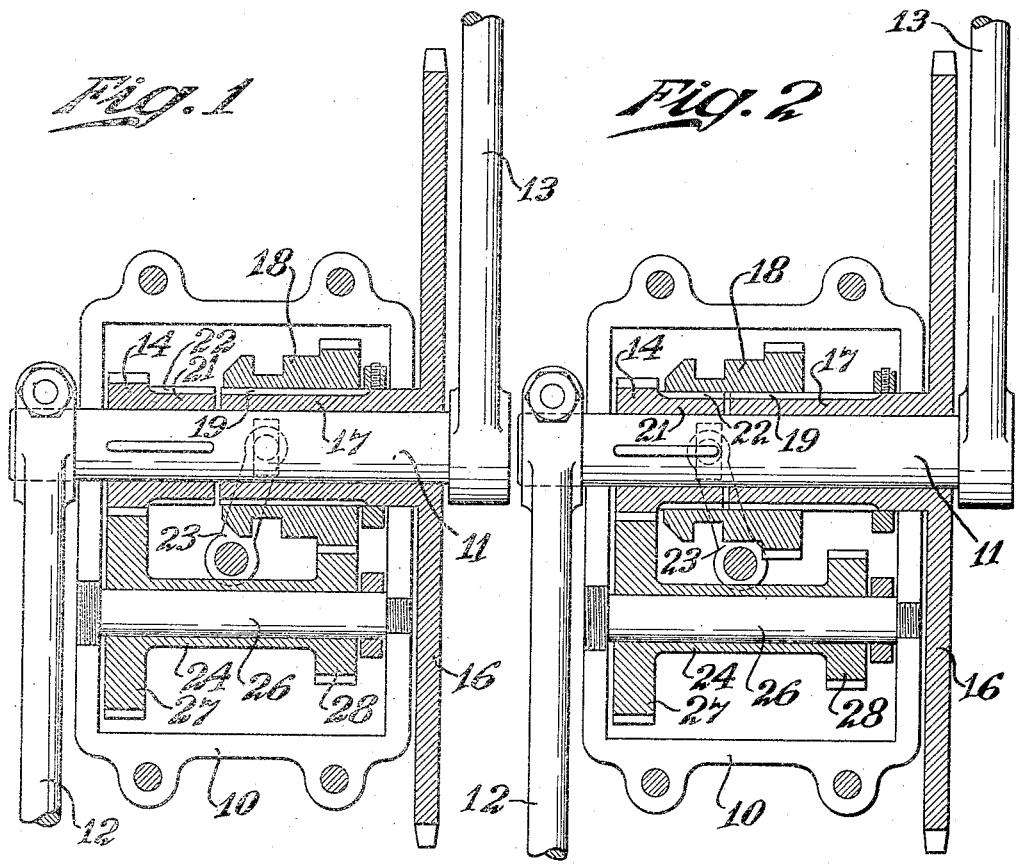
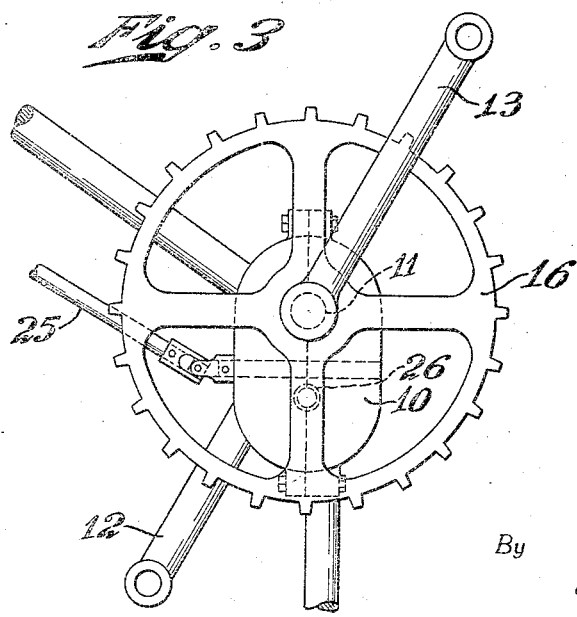
Inventor
J. F. Gordon
By
Attorney Patented Aug. 26, 1930

1,773,996

UNITED STATES PATENT OFFICE

JOHN F. GORDON, OF NITRATE PLANT, ALABAMA

CHANGE-SPEED GEAR FOR BICYCLES

Application filed October 7, 1927. Serial No. 224,553.

My invention relates to change speed gears, more particularly to change speed gears for bicycles, motorcycles or the like, and has for its object the provision of apparatus of the character designated, which shall be simple of construction and easy of operation, and which shall accomplish its purpose with a minimum of friction under high or normal speed operating conditions.

A more specific object of my invention is to provide a change speed gear of the character designated wherein a simple, effective means is provided for direct transmission between the driving and driven elements of the gear at high speed and a shift from such a direct drive to a speed reduction is accomplished by a single shiftable gear member.

In a change speed gear for bicycles and motorcycles, as heretofore proposed, the parts have been needlessly multiplied, entailing a complicated, expensive structure and considerable friction in operation. In my improved gear I have reduced the parts to a minimum and produced a gear, simple of design, and easy of manufacture and which operates with a minimum of friction.

Briefly, my invention comprises a driving gear fixedly secured to the pedal crank shaft of a bicycle, a reduction gear train, and a driven gear member, loose on the pedal shaft and having external and internal teeth together with means to connect the driven gear member directly with the driving gear, or with the reduction gear train.

Apparatus embodying features of my invention is illustrated in the accompanying drawing, forming a part of this application, wherein Fig. 1 is a sectional view of the gear showing it in low speed position;

Fig. 2 is a view similar to Fig. 1 showing the gear in high speed position; and

Fig. 3 is an end view in elevation of Figs. 1 and 2.

Referring now to the drawing for a better understanding of my invention, I show a gear case 10, which may be mounted, in any suitable manner, on the frame of a bicycle or motorcycle, not shown. Extending through the gear case 10 is a pedal crank shaft 11 having secured thereto pedal arms 12 and 13. Fixedly secured to the crank shaft 11 is a driving pinion 14, and loosely mounted on the crank shaft 11 is the usual sprocket wheel 16. The sprocket 16 is provided with a hub 17 having a driven gear member 18 shiftably mounted thereon, as by toothed or spline connections 19. The driving gear member 14 is provided with a hub portion 21, similar to the hub portion 17 of the sprocket 16. The hub portion 21 has splines or teeth 22, similar to 19 of the hub 17 so that the driven gear 18 may be shifted to cause its internal teeth or splines to coact both with the hub 17 and the hub 21 and thus directly connect the driving gear member 14 and the driven gear 18, and hence the sprocket 16, for direct or high speed drive. The driven gear member 18 is shiftable on the hub 17 by means of a shifting arm 23 which may be actuated from any suitable source, as by the manually operable shaft 25.

Mounted within the casing 10 is a countershaft 26 having mounted thereon a gear member 24 having a toothed portion 27 of a relatively large diameter and a toothed portion 28 of a relatively small diameter. The driving gear member 14 is, at all times, in mesh with the toothed portion 27. The driven gear member 18 is adapted to mesh with the toothed portion 28 when shifted out of engagement with the driving member 14, as shown in Fig. 1. In this position of the gears, the drive is from the crank shaft 11 through the driving gear member 14 to the toothed portion 27 of the gear 24 and the toothed portion 28 of the gear member 24, to the driven gear 18, thereby effecting a reduction in speed or the low speed drive. With the gears in the position shown in Fig. 2, the driven gear member 18 is out of mesh with the toothed portion 28 and is in engagement with the driving gear 14 through the splines 19 and 22, thereby effecting direct drive from the pedal crank shaft 11 to the sprocket wheel 16, having the countershaft gears 27 and 28 slowly idling.

From the foregoing it will be apparent that I have devised an improved change speed gear for bicycles, motorcycles and the like, which is simple of construction and operation and which operates with a minimum of friction.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. In a change speed gear of the character described, a gear box, a driving shaft extending through the gear box and having driving members at both ends thereof, a driven wheel having a hub loosely mounted on the driving shaft and projecting into the gear box, a reduction gear train including a floating gear member splined to the hub of the driven wheel, a pinion keyed to the driving shaft and having a hub similar to the hub of the driven wheel, and means to shift the floating gear member to telescope over the hub of the pinion and the hub of the driven wheel or to connect the driven wheel with the gear train.

2. In a bicycle change speed gear of the character described, a gear box, a continuous pedal shaft extending through the gear box, a sprocket loosely mounted on the shaft and having an elongated hub portion projecting into the gear box and provided with external teeth, a pinion fixed to the driving shaft and having a toothed hub portion similar to the hub portion of the sprocket, and a gear shiftably mounted on the sprocket hub portion and adapted to telescope over and engage with the hub portion of the pinion for high speed.

In testimony whereof I, JOHN F. GORDON, affix my signature.

JOHN F. GORDON.